United States Patent [19]

Peiffer et al.

[11] Patent Number: 5,494,717
[45] Date of Patent: * Feb. 27, 1996

[54] MATTE, BIAXIALLY ORIENTED, MULTILAYER POLYPROPYLENE FILM OF HIGH SHRINKAGE, PROCESS FOR THE PRODUCTION THEREOF, AND THE USE THEREOF

[75] Inventors: Herbert Peiffer, Mainz; Ursula Murschall, Nierstein; Gunter Schloegl, Kelkheim, all of Germany

[73] Assignee: Hoechst Aktiengesellschaft, Frankfurt am Main, Germany

[*] Notice: The portion of the term of this patent subsequent to Feb. 6, 2013, has been disclaimed.

[21] Appl. No.: 234,359

[22] Filed: Apr. 28, 1994

[30] Foreign Application Priority Data

Apr. 27, 1993 [DE] Germany .................. 43 13 640.0

[51] Int. Cl.⁶ .................................... B65B 53/00
[52] U.S. Cl. .................... 428/34.9; 428/516; 428/323; 428/910; 428/249; 428/215; 428/913
[58] Field of Search ................. 428/910, 34.9, 428/516, 215, 913, 323

[56] References Cited

U.S. PATENT DOCUMENTS

| | | | |
|---|---|---|---|
| 3,619,195 | 11/1971 | Van Campen | 96/100 |
| 4,532,189 | 7/1985 | Mueller | 428/516 |
| 4,578,316 | 3/1986 | Clauson et al. | 428/516 |
| 4,597,920 | 7/1986 | Golike | 264/22 |
| 4,622,237 | 11/1986 | Lori | 427/40 |
| 4,855,187 | 8/1989 | Osgood, Jr. et al. | 428/516 |
| 4,960,637 | 10/1990 | Biczenczuk | 428/314.4 |
| 5,051,481 | 9/1991 | Taka et al. | 525/240 |
| 5,292,561 | 3/1994 | Peiffer et al. | 428/35.1 |

FOREIGN PATENT DOCUMENTS

| | | |
|---|---|---|
| 2092773 | 10/1993 | Canada . |
| 0236945 | 9/1987 | European Pat. Off. . |
| 0436196 | 7/1991 | European Pat. Off. . |
| 0489373 | 6/1992 | European Pat. Off. . |
| 4135096 | 4/1993 | Germany . |
| 2201407 | 9/1988 | United Kingdom . |

OTHER PUBLICATIONS

*Ullmann's Encyclopedia of Industrial Chemistry*, 4th Edition, vol. 12, pp. 525–555 (1976).

Primary Examiner—Edith Buffalow
Attorney, Agent, or Firm—Foley & Lardner

[57] ABSTRACT

The invention relates to a heat-sealable, shrinkable multilayer polypropylene film which comprises at least one base layer containing a propylene polymer or a propylene polymer mixture and at least one outer layer which comprises a mixture or a blend of two components I and II. The mixture contains copolymers and terpolymers of α-olefins having 2 to 10 carbon atoms and HDPE. The film has a longitudinal shrinkage of >20 and a transverse shrinkage of >25% at 120° C.

16 Claims, No Drawings

MATTE, BIAXIALLY ORIENTED, MULTILAYER POLYPROPYLENE FILM OF HIGH SHRINKAGE, PROCESS FOR THE PRODUCTION THEREOF, AND THE USE THEREOF

BACKGROUND OF THE INVENTION

1. Field of the Invention

The present invention relates to a multilayer polypropylene film of high shrinkage which comprises at least one base layer containing a propylene polymer or a propylene polymer mixture and at least one outer layer which comprises a mixture or a blend of two polymer components.

The film according to the present invention is distinguished by a characteristic matte surface or appearance and high shrinkage in the longitudinal and transverse directions.

The invention further relates to a process for the production of the multilayer film and to the use of the film.

2. Description of Related Art

Shrink films are known and are widely used as packaging films.

Shrink packaging is usually produced starting from a pouch, into which the goods to be packaged are introduced, followed by separation/welding and subsequent shrinkage in a shrink oven. In this manner, very tight, fold-free film packaging is obtained. In order for this tight wrap to be reliably achieved, the films used must have high shrinkage values, since the film wrapping after separation/welding surrounds the contents relatively loosely. This looseness is due to the fact that the welding wire cannot be moved right up against the packaged goods. Very high shrinkage values of the films are therefore a prerequisite for their use as shrink packaging. Such films are described, for example, in EP-A-0 436 196, DE-A-19 54 467, DE-A-32 15 120 and EP-A-0 350 859.

Conventional shrink films are generally distinguished by very high sheen values and very low haze. For certain areas of application of shrink films, this appearance is undesirable, even disadvantageous. For example, the legibility of an imprint on packaged goods can be impaired due to reflection at the glossy surface of the packaging film.

In addition, all known shrink films are unsatisfactory with respect to their passage through machines, their antistatic properties, their properties during winding and their properties during further processing and slitting.

EP-A-0 489 373 discloses heat-sealable shrink films built up from a polyropylene (PP) homopolymer base layer and ethylene-propylene copolymer outer layers and which have high sheen and low haze. These films have increased shrinkage compared with other conventional heat-sealable packaging films, but the shrink properties are inadequate if tight coverings are required.

German Patent Application P 41 35 096.0 discloses multilayer polyolefin films comprising a polypropylene base layer and an outer layer made from an HDPE blend. This HDPE blend comprises HDPE and copolymers and/or terpolymers made from α-olefins and, if desired, polypropylene. The outer layer of the multilayer film has minimum sheen and maximum haze, giving the film a characteristic matte appearance.

U.S. Pat. No. 4,578,316 discloses a biaxially oriented multilayer polyolefin film whose base layer comprises a polypropylene homopolymer and whose outer layer comprises a blend of polypropylene and MDPE and/or HDPE. This polyolefin film has a low coefficient of friction together with a readily wettable surface. However, this film also has excellent optical transparency.

WO 89/10839 describes multilayer polyolefin films whose base layer comprises a polypropylene polymer and whose outer layers comprise either HDPE or an ethylene-propylene copolymer or polypropylene. The film is stretched under particular temperature conditions. It has a low coefficient of friction and good wettability, but simultaneously has high sheen and low haze.

EP-A-0 367 613 discloses a multilayer film comprising a vacuole-containing polypropylene base layer and an inscribable outer layer which contains a first polymer having a melt flow index of $\leq 1$ g/10 min and a second polymer which is incompatible with said first polymer. Incompatible meaning that the polymers are present as separate phases. An example given of the first polymer is an HDPE having a density of 0.92 to 0.97 g/cm$^3$. The incompatible polymer is polypropylene or a copolymer of propylene or a terpolymer of propylene. The film disclosed has an opaque appearance, i.e. it is essentially non-transparent to light. The film described has a density of 0.69 g/cm$^3$. This film cannot be employed for many applications due to its opacity.

SUMMARY OF THE INVENTION

One object of the present invention is to provide a highly shrinkable, biaxially oriented multilayer polypropylene film which has a characteristic uniform matte appearance, good passage through a processing machine, good antistatic properties and at the same time very good shrink properties. In addition, the film should have high suitability for rolling up and good packaging properties.

Another object of the present invention is to provide a coextrusion process for the production of the multilayer film. Still another object of the present invention is to provide a process for packaging an article with the multilayer film. Yet another object of the present invention is to provide a shrink wrapped article that is wrapped by the multilayer film.

In accomplishing the foregoing objects, there has been provided according to one aspect of the present invention a multilayer polypropylene film of high shrinkage having at least one matte surface which comprises at least one base layer containing a propylene polymer or a propylene polymer mixture and at least one outer layer which comprises a mixture or a blend of two components I and II. Component I of the mixture or blend is a propylene homopolymer or a copolymer of α-olefins having 2 to 10 carbon atoms or a terpolymer of α-olefins having 2 to 10 carbon atoms or a mixture of two or more of said homopolymers, copolymers and terpolymers or a blend of two or more of said homopolymers, copolymers and terpolymers.

Component II of the mixture or blend is a high-density polyethylene (HDPE) or a blend of HDPE and one or more further polymers selected from the group consisting of a propylene homopolymer, a copolymer of α-olefins having 2 to 10 carbon atoms, a terpolymer of α-olefins having 2 to 10 carbon atoms, and a blend of copolymers and terpolymers of α-olefins having 2 to 10 carbon atoms.

In a preferred embodiment, component I essentially comprises a propylene homopolymer,
a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixture or blends thereof, and a blend of two or more of said homopolymers, copolymers and terpolymers, mixed with one or more of said homopolymers, copolymers and terpolymers.

Component II essentially comprises an HDPE or a blend of two components A and B, where blend component A essentially comprises an HDPE and blend component B essentially comprises a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, and mixture or blends thereof.

and the multilayer film has a longitudinal shrinkage of greater than about 20%, and a transverse shrinkage of greater than about 25%, both measured at 120° C.

Another aspect of the present invention provides for a process for the production of the multilayer polypropylene film comprising the steps of coextruding the melts corresponding to the individual layers of the film through a flat-film die, taking the coextruded film off over a take-off roll whose temperature is between about 20° and 100° C. biaxially stretching the film at a longitudinal stretching ratio ($S_l$) from about 4:1 to 9:1 and a transverse stretching ratio ($S_l$) from about 6:1 to 10:1, heat-setting the biaxially stretched film, optionally corona-treating at least one surface and subsequently winding the film up.

Preferably the ratio ($S_t:S_l$) between the transverse stretching ratio $S_t$ and the longitudinal stretching ratio $S_l$ is less than about 2, more preferably from about 0.5 to 1.5.

Yet another aspect of the present invention provides a process for packaging an article comprising the steps of wrapping an article at least in part with the film of the present invention followed by shrinking the film around the article.

Still another aspect of the present invention provides a packaging article comprising the multilayer polypropylene film of the present invention surrounding at least in part an article.

Further objects, features and advantages of the invention will become apparent to persons skilled in the art from the detailed description of the preferred embodiments that follows.

DETAILED DESCRIPTION OF THE PREFERRED EMBODIMENTS

The present invention comprises a multilayer film of the generic type mentioned above, where component I of the outer layer preferably comprises a propylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

Component II preferably comprises an HDPE or a blend of two components A and B, where blend component A is preferably an HDPE and blend component B is preferably a propylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said homopolymers, copolymers and terpolymers or a blend of two or more of said homopolymers, copolymers and terpolymers.

The multilayer film has, at about 120° C. a longitudinal shrinkage of greater than about 20%, preferably from about 25 to 50%, more preferably from about 30 to 40%. The film has, at about 120° C., a transverse shrinkage of greater than about 25%, preferably from about 30 to 60%, more preferably from about 40 to 50%, and the film is matte.

Films with this shrinkage have an excellent, high shrinkage capacity compared with the known films of the prior art. They give a significantly tighter, fold- and billow-free packaging than conventional films due to the isotropic shrink properties and the increased shrinkage at elevated temperature. The uniform shrinkage in the longitudinal and transverse directions, even at elevated temperature (about 120° C.), makes an essential contribution to the uniform wrap. Generally, the ratio between the transverse shrinkage $S_t$ and the longitudinal shrinkage $S_l$ at a particular temperature is at most about 2.5. The $S_t:S_l$ ratio is preferably in the range from about 2 to 0.5, more preferably in the range from about 2 to 1. The tight, fold- and billow-free packaging in combination with a characteristic matte appearance ensures packaging having a significantly more attractive appearance.

For the purposes of the present invention, mixtures are defined as mechanical mixtures prepared from the individual components. Generally the individual constituents are combined as small compression moldings, for example lenticular or spherical granules, and mechanically mixed using a suitable vibrating device.

For the purposes of the present invention, a blend is an alloy-like compound of the individual components which cannot be re-separated into the original constituents. A blend has similar properties to a homogeneous material and can be characterized correspondingly by suitable parameters.

Films according to the invention prepared from a mixture of polymers are characterized by a less homogenous appearance than films prepared from polymer blends.

The base layer of the multilayer film according to the present invention comprises a propylene polymer or a propylene polymer mixture. For the purposes of the present invention, a propylene polymer or a propylene polymer mixture is defined as a copolymer or terpolymer of α-olefins having 2 to 8 carbon atoms, particularly copolymers or terpolymers of propylene or a mixture of said polymers. Preferred α-olefinic copolymers or terpolymers are copolymers of ethylene-propylene or propylene-butylene units or terpolymers of propylene. Particular preference is given to ethylene-propylene copolymers having an ethylene content of about 10% by weight or less and ethylene-propylene-butylene terpolymers having an ethylene content of about 1 to 7% by weight and a butylene content of about 4 to 10% by weight and a propylene content of about 83 to 95% by weight. The data in.% by weight relate to the particular copolymer or terpolymer. In addition, mixtures of two or more of the above-mentioned olefinic polymers are suitable, for example mixtures of said propylene copolymers, such as ethylene-propylene copolymers, with said propylene terpolymers, such as ethylene-propylene-butylene terpolymers.

The copolymers and/or terpolymers in the base layer have a melting point in the range of about 100° to 150° C., preferably from about 120° to 135° C., and a melt flow index in the range from about 0.5 to 10 g/10 min, preferably about from 2 to 8 g/10 min (DIN 53 735).

The base layer composition may also contain, if desired, small amounts of propylene homopolymer, but these amounts must be kept small enough that the high-shrinkage capacity of the film is not impaired. In general, the proportion of homopolymer (if present) is less than 10% by weight, preferably less than 5% by weight, based on the weight of the base layer. The homopolymers employed are, where appropriate, fundamentally the same as described below for the outer layer.

In addition, the base layer may contain effective amounts of additives, preferably antistatics and/or lubricants.

The film according to the invention has an essentially transparent base layer, i.e. one that does not contain vacuoles.

The propylene copolymer and/or propylene terpolymer employed in the base layer may be partially degraded by addition of organic peroxides. A measure of the degree of degradation of the polymer is the degradation factor A, which gives the relative change in the melt flow index, measured in accordance with DIN 53 735, of the polypropylene, based on the starting polymer.

$$A = \frac{MFI_2}{MFI_1}$$

$MFI_1$ = melt flow index of the propylene polymer before addition of the organic peroxide
$MFI_2$ = melt flow index of the propylene polymer degraded by peroxide.

In general, the degradation factor A of the propylene polymer employed is in the range from about 3 to 15, preferably from about 6 to 10.

Particularly preferred organic peroxides are dialkyl peroxides, where the term alkyl radical is defined as a conventional saturated, straight-chain or branched lower alkyl radical having up to six carbon atoms. Particular preference is given to 2,5-dimethyl-2,5-di(t-butylperoxy)hexane and di-t-butyl peroxide.

The base layer of the film according to the invention can additionally contain a resin, generally in an amount from about 1 to 20% by weight, preferably from about 1 to 10% by weight, more preferably from about 1 to 5% by weight, based on the weight of the base layer. Preferred resins are low-molecular-weight resins, particularly hydrocarbon resins. The hydrocarbon resins may be partially or fully hydrogenated. Suitable resins are basically synthetic resins or resins of natural origin. It has proven particularly advantageous to employ resins having a softening point of about $\leq 80°$ C. (measured in accordance with DIN 1995-U4 or ASTM E-28), preferably those having a softening point from about 100° to 180° C., more preferably from about 120° to 160° C. The resin is preferably incorporated into the film in the form of a masterbatch, which is introduced into the extruder (for example a single-screw or cascade extruder). Examples of conventional masterbatches are those containing from about 30 to 70% by weight, preferably about 50% by weight, of propylene copolymer and/or terpolymer and from about 70 to 30% by weight, preferably about 50% by weight, of hydrocarbon resin. The data in % by weight relate to the total weight of propylene polymer and hydrocarbon resin.

Of the numerous resins, hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for long periods of time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants. The terpene resins are also phenol-modified terpene resins. Specific examples of terpenes which may be mentioned are pinene, α-pinene, dipentene, limonene, myrcene, camphene and similar terpenes.

Hydrocarbon resins employed are also styrene homopolymers, styrene copolymers, cyclopentadiene homopolymers, cyclopentadiene copolymers and/or terpene polymers. These hydrocarbon resins have a softening point above about 100° C. (in the case of unsaturated polymers, the hydrogenated product is preferred). Particular preference is given to cyclopentadiene polymers having a softening point of about 140° C. or above in the base layer.

The hydrocarbon resins can also be so-called modified hydrocarbon resins. The modification is generally carried out by reaction of the raw materials before the polymerization, by the introduction of specific monomers or by reaction of the polymerized product, particularly by hydrogenation or partial hydrogenation.

The multilayer film according to the present invention also contains at least one outer layer which comprises the mixture or blend of the two components I and II described above and set forth in greater detail below.

Component I of the outer layer mixture or of the blend preferably comprises
 a propylene homopolymer or
 a copolymer of
 ethylene and propylene or
 ethylene and butylene or
 propylene and butylene or
 ethylene and another α-olefin having 5 to 10 carbon atoms or
 propylene and another α-olefin having 5 to 10 carbon atoms or
 a terpolymer of
 ethylene and propylene and butylene or
 ethylene and propylene and another α-olefin having 5 to 10 carbon atoms or
 a mixture of two or more of said homopolymers, copolymers and terpolymers or
 a blend of two or more of said homopolymers, copolymers and terpolymers, if desired mixed with one or more of said homopolymers, copolymers and terpolymers.

In a preferred embodiment, component I advantageously comprises
 a propylene homopolymer or
 a copolymer of
 ethylene and propylene or
 ethylene and 1-butylene or
 propylene and 1-butylene or
 a terpolymer of
 ethylene and propylene and 1-butylene or
 a mixture of two or more of said particularly preferred homopolymers, copolymers and terpolymers or
 a blend of two or more of said particularly preferred homopolymers, copolymers and terpolymers, if desired mixed with one or more of said homopolymers, copolymers and terpolymers.

Particular preference is given to
 propylene homopolymers or
 random ethylene-propylene copolymers having
  an ethylene content from about 2 to 10% by weight, preferably from about 5 to 8% by weight, or
 random propylene-1-butylene copolymers having
  a butylene content from about 5 to 40% by weight, preferably from about 20 to 30% by weight,
  in each case based on the total weight of the copolymer, or
 random ethylene-propylene-1-butylene terpolymers having
  an ethylene content from about 1 to 10% by weight, preferably from about 2 to 6% by weight, and
  a 1-butylene content from about 3 to 20% by weight, preferably from about 8 to 10% by weight,
  in each case based on the total weight of the terpolymer, or
 a blend of an ethylene-propylene-1-butylene terpolymer and a propylene-1-butylene copolymer
  having an ethylene content from about 0.1 to 7% by weight
  and a propylene content from about 50 to 90% by weight
  and a 1-butylene content from about 10 to 40% by weight,
  in each case based on the total weight of the polymer blend.

The propylene homopolymer employed as or in component I comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene, is preferred. The propylene homopolymer of component I or the homopolymer present therein generally has a melt flow index from about 0.5 g/10 min to 15 g/10 min, preferably from about 1.5 g/10 min to 6 g/10 min, at 230° C. and a force of 21.6N (DIN 53 735).

Component II of the outer layer mixture or blend preferably comprises an HDPE or a blend comprising HDPE as component A and a component B. For the purposes of the present invention, HDPE is taken to mean high-pressure polyethylenes which have the following properties:

1. The melt flow index (MFI), measured in accordance with DIN 53 735 or ISO 1133 at 50N/190° C., is in the range from about 0.2 to 50 g/10 min, preferably from greater than about 1.5 to 45 g/10 min, more preferably from about 5 to 35 g/10 min.

2. The viscosity index, measured in accordance with DIN 53 728, Part 4, or ISO 1191, is in the range from about 100 to 450 cm$^3$/g, preferably from about 120 to 280 cm$^3$/g.

3. The crystallinity is from about 35 to 80%, preferably from about 50 to 80%.

4. The density, measured at 23° C. in accordance with DIN 53 479, Method A, or ISO 1183, is in the range from about 0.93 to 0.97 g/cm$^3$, preferably from about 0.95 to 0.96 g/cm$^3$.

5. The melting point, measured by a differential scanning calorimeter (DSC) (maximum of the melting curve, heating rate 20° C./min) is between about 120° and 150° C., preferably between about 125° and 135° C.

The HDPE as component II and HDPE as blend component A is selected from the above-described polyethylenes, so that the same HDPE as blend component A is in principle suitable as component II, but they need not be identical.

Blend component B preferably comprises
 a propylene homopolymer or
 a copolymer of
 ethylene and propylene or
 ethylene and butylene or
 propylene and butylene or
 ethylene and another α-olefin having 5 to 10 carbon atoms or
 propylene and another α-olefin having 5 to 10 carbon atoms or
 a terpolymer of
 ethylene and propylene and butylene or
 ethylene and propylene and another α-olefin having 5 to 10 carbon atoms or
 a mixture of two or more of said homopolymers, copolymers and terpolymers or
 a blend of two or more of said homopolymers, copolymers and terpolymers.

In a preferred embodiment, blend component B advantageously comprises
 a propylene homopolymer or
 a copolymer of
 ethylene and propylene or
 ethylene and 1-butylene or propylene and 1-butylene or
a terpolymer of
ethylene and propylene and 1-butylene or
a mixture of two or more of said homopolymers, copolymers and terpolymers or
a blend of two or more of said homopolymers, copolymers and terpolymers.

Particular preference is given to
propylene homopolymers or
random ethylene-propylene copolymers having
an ethylene content from about 2 to 10% by weight, preferably from about 5 to 8% by weight, or
random propylene-1-butylene copolymers having
a butylene content of from about 5 to 40% by weight, preferably from about 20 to 30% by weight,
in each case based on the total weight of the copolymer, or
random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight,
in each case based on the total weight of the terpolymer, or
a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content from about 10 to 40% by weight,
in each case based on the total weight of the polymer blend.

The propylene homopolymer employed as or in blend component B comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene, is preferred. The homopolymer of blend component B or the homopolymer present therein generally has a melt flow index from about 0.5 g/10 min to 15 g/10 min, preferably from about 1.5 g/10 min to 6 g/10 min, at 230° C. and a force of 21.6 N (DIN 53 735).

The weight ratio between the two blend components A and B is from about A:B=20:80 to A:B=80:20, preferably from about A:B=40:60 to A:B=60:40, more preferably about A:B=45:55.

The blend of components A and B has a melt flow index (DIN 53 735 at 230° C. and a load of 21.6N) from about 1.5 g/10 min to 12 g/10 min, preferably from about 2.5 g/10 min to 6 g/10 min. The melt flow index of the blend is preferably higher than that of the propylene polymer of the base layer. The melting range of the blend is between about 100° and 160° C., preferably between about 120° and 150° C.

The weight ratio between the two components I and II of the outer layer mixture or of the blend can vary within broad limits and depends on the intended application of the multilayer film. The ratio between components I and II is preferably in a range from about I:II=10:90 to I:II=90:10, preferably between about I:II=30:70 to I:II=70:30, more preferably about I:II=50:50.

The highly shrinkable multilayer film according to the invention comprises at least the above-described base layer and at least one matte outer layer which comprises the above-described outer layer mixture or blend. Depending on its intended application, the multilayer film may have another outer layer on the opposite side, which also has a low heat-sealing temperature.

The structure, thickness and composition of a second outer layer can be selected independently of the first matte outer layer which is already present. Preferred embodiments of the multilayer film have three layers. The second outer layer can comprise one of the above-described mixtures or blends of the present invention, which is not necessarily identical to that of the first outer layer. However, the second outer layer may also comprise any other conventional outer layer polymer.

The thickness of the matte outer layer(s) is greater than about 0.4 μm, preferably in the range from about 0.8 to 4 μm, more preferably from about 1 to 3 μm. The outer layers on both sides can have identical or different thicknesses.

The overall thickness of the multilayer polyolefin film according to the present invention can vary within broad limits and depends on the intended use. It is preferably from about 5 to 70 μm, more preferably from about 5 to 40 μm, with the base layer making up from about 50 to 90% of the overall film thickness.

The density of the film according to the present invention is generally at least about 0.8 g/cm$^3$, preferably in the range from about 0.9 to 0.94 g/cm$^3$.

In order to improve the adhesion properties of the outer layer(s), one surface of the film may be corona or flame-treated. If desired, the corresponding treatment can be carried out on both surfaces.

In order to further improve specific properties of the polypropylene film according to the present invention, both the base layer and the outer layer(s) may further contain an effective amount of additives. Preferred additives are antiblocking agents and/or stabilizers and/or neutralizers and/or lubricants and/or antistatics which are compatible with the polymers of the base layer and of the outer layer(s), with the exception of antiblocking agents which are generally incompatible. All amount data hereinafter is in percent by weight (% by weight) and in each case relate to the layer or layers to which the additive can be added.

Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like.

Preference is given to benzoguanamine-formaldehyde polymers, silicon dioxide and calcium carbonate. The effective amount of antiblocking agent is in the range from about 0.1 to 2% by weight, preferably from about 0.1 to 0.5% by weight. The mean particle size is between about 1 and 6 μm, preferably between about 2 and 5 μm. Particles having a spherical shape, as described in EP-A-0 236 945 and DE-A-38 01 535, are particularly suitable. The antiblocking agents are preferably added to the outer layers.

Stabilizers which can be employed are conventional compounds which have a stabilizing action for polymers of ethylene, propylene and other α-olefins. Their added amount is between about 0.05 and 2% by weight. Particularly suitable are phenolic stabilizers, alkali metal or alkaline earth metal stearates and/or alkali metal or alkaline earth metal carbonates.

Phenolic stabilizers are preferred in an amount from about 0.1 to 0.6% by weight, preferably from about 0.15 to 0.3% by weight, and have a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Neutralizers are preferably calcium stearate and/or calcium carbonate having a mean particle size of at most about 0.7 μm, an absolute particle size of less than about 10 μm and a specific surface area of at least about 40 m$^2$/g.

Lubricants are higher aliphatic acid amides, higher aliphatic acid esters, waxes and metal soaps and polydimethylsiloxanes. The effective amount of lubricant is in the range from about 0.01 to 3% by weight. Particularly suitable is the addition of higher aliphatic acid amides in the range from about 0.05 to 0.25% by weight in the base layer and/or the outer layers. A particularly suitable aliphatic acid amide is erucamide. The addition of polydimethylsiloxanes is preferably in the range from about 0.1 to 2.0% by weight. Polydimethylsiloxanes having a viscosity from about 10,000 to 1,000,000 mm$^2$/s are especially preferred.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$) alkyl groups. N,N-bis(2-hydroxyethyl)alkylamines having 10 to 20 carbon atoms, preferably 12 to 18 carbon atoms, in the alkyl radical are particularly suitable. The effective amount of antistatic is in the range from about 0.05 to 0.3% by weight. Glycerol monostearate is another preferred as antistatic.

Another aspect of the present invention relates to a process for the production of the multilayer film according to the present invention by the coextrusion process, which is known per se. This process is carried out by coextruding the melts corresponding to the individual layers of the film through a flat-film die, taking off the resultant film over one or more rolls for solidification, subsequently biaxially stretching (orienting) the film, heat-setting the biaxially stretched film and, if desired, corona- or flame-treating the surface layer intended for treatment.

The biaxial stretching (orientation) can be carried out simultaneously or consecutively. Consecutive biaxial stretching, in which stretching is carried out first longitudinally (i.e., in the machine direction) and then transversely (i.e., perpendicular to the machine direction), is preferred. The stretching conditions are selected so that the film has the most balanced orientation possible, it has virtually isotropic i.e., properties. The temperature during the stretching processes should be selected so that the film has the desired high shrinkage.

As is conventional in coextrusion, the polymer or polymer mixture of the individual layers is compressed and liquified in an extruder, with it being possible for any additives to be already present in the polymer or polymer mixture or added at this time. The melts are then extruded simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. The stretching in the longitudinal direction is preferably from about 4:1 to 9:1 and the stretching in the transverse direction is from about 6:1 to 10:1, preferably from about 6:1 to 8:1. The longitudinal stretching is expediently carried out with the aid of two rolls running at different speeds corresponding to the desired stretching ratio, and the transverse stretching is expediently carried out with the aid of an appropriate tenter frame. The film is advantageously not highly stretched in the transverse direction. In order to achieve the shrinkage properties which are essential to the invention, a ratio between the transverse and longitudinal stretching ratios of less than about 2, preferably less than about 1.5, should be maintained. This ratio is preferably in the range from about 0.5 to 1.5.

Biaxial stretching of the film is followed by heat-setting (heat treatment). The film is kept at a temperature of about 40° to 130° C., preferably from about 40° to 100° C. for about 0.5 to 10 seconds. The film is subsequently wound up in the conventional manner by means of a wind-up unit.

It has proven advantageous to keep the take-off roll or rolls at a temperature of about from 10° to 100° C., preferably from about 20° to 60° C., by means of a heating and cooling circuit. This serves the purpose of cooling and solidifying the extruded film.

The longitudinal stretching is advantageously carried out at a temperature below about 130° C., preferably in the range from about 80° to 120° C. The transverse stretching is advantageously carried out at a temperature of above about 80° C., preferably from about 90° to 140° C.

If desired, one or both surfaces of the film can, as mentioned above, be corona- or flame-treated by one of the known methods after the biaxial stretching. The treatment intensity is generally in the range from about 38 to 42 mN/m.

In the case of corona treatment an advantageous procedure is to pass the film between two conductor elements serving as electrodes. A high voltage, usually alternating voltage (from about 5 to 20 kV and from about 5 to 30 kHz), is applied between the electrodes so that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 500 and 3,000 V, preferably in the range from about 1,500 to 2,000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer using this procedure is substantially less than in the case of standard flame treatment, and films can be obtained in which the heat-sealing properties of the treated side are even better than those of the untreated side.

The multilayer film according to the present invention is distinguished by a very homogeneous appearance, a characteristic matte sheen and excellent shrinkage properties. In addition, the film has excellent running properties on automatic packaging machines. The film also has very good antistatic properties.

Surprisingly, it has been found that the film according to the present invention having the shrinkage characteristics and outer layer composition described herein has an excellent shrinkage capacity. It has a significantly tighter, fold- and billow-free packaging than conventional films due to the highly increased, virtually isotropic shrinkage, even at elevated temperature. The tight, fold- and billow-free packaging in combination with the characteristic matte appearance ensures a significantly more attractive appearance.

In addition to the excellent shrinkage properties, the film is distinguished by a uniform matte appearance. The films according to the invention exhibit the desired 'matte' appearance if the film has the most uniform appearance possible and if the sheen and haze of the films have low and relatively high values respectively (compared with 'transparent' films), but not minimum or maximum values. It has been found that films having sheen values (at a measurement angle of 85°, measured in accordance with ASTM-D-523-78) of less than about 80, preferably less than about 60, and a haze (measured in accordance with ASTM-D-1003) of greater than about 10, preferably greater than about 30, are matte. The respective values for sheen and haze in an embodiment should only vary within relatively narrow limits, i.e. by a maximum of 20%. This requirement is satisfied particularly well if the sheen is in the range from about 25 to 45 (85°, ASTM-D-5237) and the haze is in the range from about 40 to 80, preferably from about 50 to 70, and the variations of sheen and haze over the entire film are less than about 20%, preferably from about 1 to 10%.

It has also been found that the passage of the shrink films of the present invention through packaging machines has been significantly improved, and the films simultaneously have excellent antistatic properties.

The shrink film of the present invention is particularly advantageous with respect to its roll-forming properties. The film has a significantly reduced tendency toward telescoping and very good winding behavior.

In summary, it should be noted that the multilayer film according to the invention is distinguished by a multiplicity of advantageous properties, which make it particularly suitable for its preferred application as a highly shrinkable packaging film. These advantageous properties include:
very good shrinkage properties,
a uniform matte appearance,
good passage through the machine,
good antistatic properties,
high suitability for rolling up, and
very good conversion properties.

The excellent shrink properties ensure a tight, fold-and billow-free packaging. At the same time, the film satisfies all other requirements made of packaging materials. The shrink film can be advantageously processed on high-speed packaging machines and has good antistatic properties. It has a particularly uniform matte appearance. In addition, the film can be advantageously printed metallized, or laminated, particularly after corona or flame treatment. The film according to the invention is thus highly suitable for its intended application as a packaging film having a particularly broad range of applications, for example as film packaging for books, frames, toys, foodstuffs, cosmetics, etc.

The invention is now described in greater detail with reference to working examples as shown in Table 1 below. In the following examples, $C_2$ is defined as ethylene, $C_3$ is defined as propylene and $C_4$ is defined as butylene.

TABLE 1

| | Component I | Component II | I:II |
|---|---|---|---|
| E1 | $C_3$-homopolymer | HDPE + $C_3$-homopolymer | 50:50 |
| E2 | $C_2/C_3$-copolymer | HDPE + $C_3$-homopolymer | 50:50 |
| E3 | $C_2/C_3$-copolymer | HDPE + $C_3$-homopolymer | 70:30 |
| E4 | $C_2/C_3/C_4$-terpolymer + $C_3/C_4$-copolymer | HDPE + $C_2/C_3$-copolymer | 60:40 |
| E5 | $C_2/C_3$-copolymer | HDPE + $C_2/C_3$-copolymer | 50:50 |
| E6 | $C_2/C_3$-copolymer | HDPE + $C_2/C_3$-copolymer | 70:30 |
| E7 | $C_2/C_3$-copolymer | HDPE + $C_2/C_3/C_4$-terpolymer | 50:50 |
| E8 | $C_2/C_3$-copolymer | HDPE + $C_2/C_3/C_4$-terpolymer | 70:30 |
| E9 | $C_2/C_3$-copolymer | HDPE + $C_2/C_3/C_4$-terpolymer + $C_3/C_4$-copolymer | 50:50 |
| E10 | $C_2/C_3/C_4$-terpolymer | HDPE + $C_2/C_3/C_4$-terpolymer + $C_3/C_4$-copolymer | 50:50 |
| E11 | $C_2/C_3/C_4$-terpolymer | HDPE + $C_2/C_3/C_4$-terpolymer | 50:50 |
| E12 | $C_3$-homopolymer | HDPE | 50:50 |
| E13 | $C_2/C_3$-copolymer | HDPE | 50:50 |
| E14 | $C_2/C_3$-copolymer | HDPE | 70:30 |
| E15 | $C_2/C_3/C_4$-terpolymer | HDPE | 50:50 |
| E16 | $C_2/C_3/C_4$-terpolymer | HDPE | 70:30 |

E = Example

EXAMPLE 1

A three-layer film with a thickness of 1 mm and the layer structure XZX, i.e. the base layer Z was surrounded by two identical outer layers X, was extruded by the coextrusion process from a flat-film die at an extrusion temperature of 230° C.

The base layer essentially comprised a random propylene-ethylene copolymer having an ethylene content of 4.5% by weight, a melting point of 134° C., and a melt flow index of 7.0 g/10 min at 230° C. and 21.6N (DIN 53 735).

In addition the base layer contained 0.2% by weight of an N,N-bis(hydroxyethyl)($C_{10}$–$C_{20}$)alkylamine (Armostat® 300) and 0.05% by weight of erucamide.

The two outer layers X essentially comprised a mechanical mixture of components I and II in the ratio of I:II=50:50. Component I comprised a propylene homopolymer having an n-heptane-soluble content of 4.5% by weight and a melting point of 165° C. The melt flow index of the propylene homopolymer was 6.0 g/10 min at 230° C. and a load of 21.6N (DIN 53 735).

Component II comprised a blend of two components A and B in the ratio A:B=50:50. Component A comprised an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C., measured by DSC. Component B comprised a propylene homopolymer having an n-heptane-soluble content of 4.5% by weight and a melting point of 165° C. The melt flow index of component B was 7.0 g/10 min at 230° C. and a load of 21.6N (DIN 53 735).

Components I and II were mixed mechanically in a Henschel mixer for 2 minutes at 500 rpm in the ratio I:II =50:50, giving a homogeneous granule mixture.

All layers contained 0.12% by weight of pentaerythrityl tetrakis[4-(3,5-di-tert-butyl-4-hydroxyphenyl)propionate (Irganox® 1010) as a stabilizer and 0.06% by weight of calcium stearate as a neutralizer.

After coextrusion, the extruded three-layer film was taken off over the corresponding process steps via a take-off roll and cooled. The film was subsequently stretched longitudinally and stretched transversely. After stretching, the film was set and corona-treated. The following conditions, in detail, were selected:

Extrusion: Extrusion temperature 230° C. Take-off roll

|   |   |
|---|---|
| | temperature 40° C. |
| Longitudinal stretching: | Stretching roll T = 100° C. |
| | Longitudinal stretching by |
| | a factor of 6.5 |
| Transverse stretching: | Heat-up zones T = 115° C. |
| | Stretching zones T = 115° C. |
| | Transverse stretching by a |
| | factor of 7.5 |
| Setting: | Temperature T = 70° C. |
| Corona treatment: | Voltage: 10,000 V |
| | Frequency: 10,000 Hz |

The multilayer film produced in this way had a matte surface on both sides and had a surface tension of from 40 to 41 mN/m, directly after production.

The film had virtually isotropic orientation and excellent shrinkage capacity.

The film had a thickness of about 21 μm, with the base layer having a thickness of 19 μm and each outer layer having a thickness of 100 nm.

EXAMPLE 2

Example 1 was repeated with the following changes. Component I comprised a random ethylene-propylene copolymer having an ethylene content of 5% by weight, based on the weight of the copolymer. The melting point of the copolymer was 134° C., and the melt flow index was 7.0 g/10 min.

EXAMPLE 3

Example 2 was repeated with the following changes. The mixing ratio between the two components I and II was I:II=70:30.

EXAMPLE 4

Example 1 was repeated with the following changes.

Component I comprised a polymer blend of an ethylene-propylene-1-butylene terpolymer and a propylene-1-butylene copolymer, corresponding to a content of 0.7% by weight of ethylene, 81.3% by weight of propylene and 18% by weight of butylene, based on the polymer blend.

Component II comprised a blend of two components A and B in the ratio A:B=50:50. Component A comprised an HDPE having an MFI (50N/190° C.) of 11 g/10 min (measured in accordance with DIN 53 735), a viscosity index of 160 cm$^3$/g (measured in accordance with DIN 53 728, Part 4), a density of 0,954 g/cm$^3$ (measured in accordance with DIN 53 479, Method A), a degree of crystallization of 68% and a melting point of 132° C., measured by DSC. Component B comprised a random ethylene-propylene copolymer having an ethylene content of 5% by weight, based on the weight of the copolymer. The melting point of the copolymer was 134° C. and the melt flow index was 7.0 g/10 min.

The mixing ratio between the two components I and II was I:II=60:40.

EXAMPLE 5

Example 4 was repeated with the following changes. Component I comprised a random ethylene-propylene copolymer having an ethylene content of 5% by weight, based on the weight of the copolymer. The melting point of the copolymer was 134° C. and the melt flow index was 7.0 g/10 min.

The mixing ratio between the two components I and II was I:II=50:50.

EXAMPLE 6

Example 5 was repeated with the following changes. The mixing ratio between the two components I and II was I:II=70:30.

EXAMPLE 7

Example 5 was repeated with the following changes. Component II comprised a blend of two components A and B in the ratio A:B=50:50. Component A comprised an HDPE having an MFI (50N/190° C.) of 11 g/10 min (measured in accordance with DIN 53 735), a viscosity index of 160 cm$^3$/g (measured in accordance with DIN 53 728, Part 4), a density of 0.954 g/cm$^3$ (measured in accordance with DIN 53 479, Method A), a degree of crystallization of 68% and a melting point of 132° C, measured by DSC. Component B comprised a terpolymer of ethylene, propylene and 1-butylene units, having an ethylene content of 1.9% by weight and a 1-butylene content of 8.4% by weight, based on the terpolymer.

EXAMPLE 8

Example 7 was repeated with the following changes. The mixing ratio between the two components I and II was I:II=70:30.

EXAMPLE 9

Example 5 was repeated with the following changes. Component II comprised a blend of two components A and B in the ratio A:B=50:50. Component A comprised an HDPE having an MFI (50 N/190° C.) of 11 g/10 min (measured in accordance with DIN 53 735), a viscosity index of 160 cm$^3$/g (measured in accordance with DIN 53 728, Part 4), a density of 0.954 g/cm$^3$ (measured in accordance with DIN 53 479, Method A), a degree of crystallization of 68% and a melting point of 132° C., measured by DSC. Component B comprised a polymer blend of an ethylene-propylene-1-butylene terpolymer and a propylene-1-butylene copolymer, corresponding to a content of 0.7% by weight of ethylene, 81.3% by weight of propylene and 18% by weight of butylene, based on the polymer blend.

EXAMPLE 10

Example 9 was repeated with the following changes. Component I comprised a terpolymer of ethylene, propylene and 1-butylene units, having an ethylene content of 1.9% by weight and a 1-butylene content of 8.4% by weight, based on the terpolymer.

EXAMPLE 11

Example 7 was repeated with the following changes. Component I comprised a terpolymer of ethylene, propylene and 1-butylene units, having an ethylene content of 1.9% by weight and a 1-butylene content of 8.4% by weight, based on the terpolymer.

EXAMPLE 12

Example 1 was repeated with the following changes. Component II comprised a pure HDPE having an MFI (50N/190° C.) of 11 g/10 min (measured in accordance with DIN 53 735), a viscosity index of 160 cm$^3$/g (measured in accordance with DIN 53 728, Part 4), a density of 0,954 g/cm³ (measured in accordance with DIN 53 479, Method A), a degree of crystallization of 68% and a melting point of 132° C., measured by DSC.

EXAMPLE 13

Example 2 was repeated with the following changes. Component II corresponded to that of Example 12.

EXAMPLE 14

Example 3 was repeated with the following changes. Component II corresponded to that of Example 12.

EXAMPLE 15

Example 11 was repeated with the following changes. Component II corresponded to that of Example 12.

EXAMPLE 16

Example 15 was repeated with the following changes. The mixing ratio between the two components I and II was I:II=70:30.

EXAMPLE 17

Example 2 was repeated with the following changes. The base layer essentially comprised a propylene-ethylene-1-butylene terpolymer having an ethylene content of 1.9% by weight and a 1-butylene content of 8.4% by weight, based on the terpolymer. The terpolymer had a melt flow index of 55 g/10 min at 230° C. and 21.6N (DIN 53 735) and a melting point of 135° C.

The raw materials and films were characterized using the following measurement methods:

Melt flow index

The melt flow index was measured in accordance with DIN 53 735 at a load of 21.6N and 230° C. or at a load of 50N and 190° C.

Melting point

DSC measurement, maximum of the melting curve, heating rate 20° C./min.

Viscosity index J

The viscosity index is a measure of the molecular weight. The viscosity index is measured in accordance with DIN 53 728, Part 4, in 0.1% strength decahydronaphthalene solution at 135° C.

Density ρ

The density is determined in accordance with DIN 53 479, Method A.

Degree of crystallization α

The degree of crystallization can be determined from the following equation:

$$\alpha = \frac{\rho - \rho_{amorphous}}{\rho_{crystalline} - \rho_{amorphous}} \cdot 100\%$$

where
$\rho_{amorphous} = 0.8549$ g/cm³
$\rho_{crystalline} = 1.0005$ g/cm³
$\rho$=density of the HDPE grade employed Haze The haze of the film was measured in accordance with ASTM-D 1003-52.

Sheen

The sheen was determined in accordance with DIN 67 530. The reflector value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photo-electronic receiver are indicated as a proportional electrical quantity. The measurement value is dimensionless and must be specified together with the angle of incidence.

Roughness

The roughness was determined in accordance with DIN 4768.

Friction

The friction was determined in accordance with DIN 53 375.

Surface tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as being moderate, and if a significant amount of ink was removable, it was assessed as being poor.

Shrinkage:

The longitudinal and transverse shrinkage values are based on the respective increase in length of the film (longitudinally $L_0$ and transversely $T_0$) before the shrinking process. The longitudinal direction is the machine direction, and the transverse direction is accordingly defined as a direction perpendicular to the machine direction. The test sample is shrunk in a fan-assisted oven at the respective temperature (90° or 120° C.) for a period of 15 minutes. The permanent elongations of the sample in the longitudinal and transverse directions is then redetermined ($L_1$ and $T_1$). The shrinkage is then given as the difference between the measured elongations compared with the original lengths $L_0$ and T0

$$\text{longitudinal shrinkage} \quad S_l = \frac{L_0 - L_1}{L_0}$$

$$\text{transverse shrinkage} \quad S_t = \frac{T_0 - T_1}{T_0}$$

This determination method for the longitudinal and transverse shrinkage corresponds to DIN 404 34.

Passage through machine:

The smoothness of the passage through the wrapping machine was determined visually and was assessed as follows:

| | | |
|---|---|---|
| very good (++) | <2% | of the sample packs are faultily wrapped |
| good (+) | 2–6% | of the sample packs are faultily wrapped |
| moderate (+−) | 6–12% | of the sample packs are faultily wrapped |
| poor (−) | 12% | or more of the sample packs are faultily wrapped. |

Table 2 below shows the properties of the polypropylene films of the examples.

TABLE 2

| Ex. | Sheen (ASTM D-523-78) Measurement angle 85° | Haze (ASTM 1003) % | Roughness (c.o. 0.25 mm) μm | Coefficient of friction – | Surface tension after storage for 6 months mN/m | Visual assessment of the matt appearance (++ = very good) | Shrinkage 120° C. % long. | transv. |
|---|---|---|---|---|---|---|---|---|
| E1 | 40 | 60 | 2.5 | 0.5 | 38 | ++ | 35 | 42 |
| E2 | 32 | 66 | 3.0 | 0.4 | 39 | ++ | 33 | 44 |
| E3 | 42 | 58 | 2.3 | 0.5 | 38 | ++ | 36 | 43 |
| E4 | 38 | 62 | 2.6 | 0.4 | 39 | ++ | 32 | 41 |
| E5 | 30 | 68 | 3.2 | 0.3 | 39 | ++ | 34 | 43 |
| E6 | 38 | 63 | 2.6 | 0.4 | 39 | ++ | 34 | 44 |
| E7 | 32 | 65 | 2.9 | 0.4 | 39 | ++ | 35 | 43 |
| E8 | 38 | 62 | 2.7 | 0.4 | 39 | ++ | 36 | 41 |
| E9 | 34 | 63 | 3.3 | 0.4 | 39 | ++ | 35 | 41 |
| E10 | 36 | 62 | 2.6 | 0.4 | 39 | ++ | 31 | 43 |
| E11 | 35 | 62 | 2.6 | 0.4 | 39 | ++ | 29 | 44 |
| E12 | 31 | 68 | 3.0 | 0.4 | 38 | ++ | 32 | 43 |
| E13 | 29 | 70 | 3.2 | 0.3 | 39 | ++ | 34 | 41 |
| E14 | 32 | 66 | 2.8 | 0.3 | 39 | ++ | 35 | 44 |
| E15 | 30 | 68 | 3.0 | 0.3 | 39 | ++ | 33 | 42 |
| E16 | 34 | 64 | 2.8 | 0.4 | 39 | ++ | 34 | 44 |
| E17 | 32 | 70 | 3.0 | 0.4 | 39 | ++ | 36 | 47 |

What is claimed is:

1. A multilayer polypropylene film of high shrinkage having at least one matte surface, comprising: at least one base layer which comprises a propylene polymer or a propylene polymer mixture; and at least one outer layer which comprises a mixture or a blend of two components I and II, wherein component I is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms,
mixture or blends thereof and
a blend of two or more of said homopolymers, copolymers and terpolymers, mixed with one or more of said homopolymers, copolymers and terpolymers,
and component II is selected from the group consisting of an HDPE and a blend of two components A and B, where blend component A essentially comprises an HDPE and blend component B is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene
a terpolymer of ethylene and propylene and another α-olefin having 5 to 10 carbon atoms and
mixtures or blends thereof, and the multilayer film has a longitudinal shrinkage of greater than about 20%, and a transverse shrinkage of greater than about 25%, both measured at 120° C.

2. A multilayer polypropylene film as claimed in claim 1, wherein component I is selected from the group consisting of
a propylene homopolymer,
a copolymer of ethylene and propylene,
a copolymer of ethylene and 1-butylene,
a copolymer of propylene and 1-butylene,
a terpolymer of ethylene and propylene and 1-butylene,
mixtures or blends thereof, and
a blend of two or more said homopolymers, copolymers and terpolymers, mixed with one or more of said homopolymers, copolymers and terpolymers; and blend component B is selected from the group consisting of
a propylene homopolymer,
a copolymer of ethylene and propylene,
a copolymer of ethylene and 1-butylene,
a copolymer of propylene and 1-butylene,
a terpolymer of ethylene and propylene and 1-butylene or and
mixtures or blends thereof.

3. A multilayer polypropylene film as claimed in claim 2, wherein component I is selected from the group consisting of propylene homopolymers,
random ethylene-propylene copolymers having
an ethylene content from about 2 to 10% by weight,
random propylene-1-butylene copolymers having
a butylene content from about 5 to 40% by weight,
in each case based on the total weight of the copolymer,
random ethylene-propylene-1-butylene terpolymers having
an ethylene content from about 1 to 10% by weight, and
a 1-butylene content from about 3 to 20% by weight,
in each case based on the total weight of the terpolymer, and
a blend of an ethylene-propylene-1-butylene terpolymer and a propylene-1-butylene copolymer having an ethylene content from about 0.1 to 7% by weight and a propylene content from about 50 to 90% by weight and a 1-butylene content from about 10 to 40% by weight, in each case based on the total weight of the polymer blend, and blend component B is selected from the group consisting of propylene homopolymers, random ethylene-propylene copolymers having
an ethylene content from about 2 to 10% by weight, random propylene-1-butylene copolymers having
a butylene content from about 5 to 40% by weight, in each case based on the total weight of the copolymer, random ethylene-propylene-1-butylene terpolymers having
an ethylene content from about 1 to 10% by weight, and
a 1-butylene content from about 3 to 20% by weight, and in each case based on the total weight of the terpolymer, a blend of an ethylene-propylene-1-butylene terpolymer and a propylene-1-butylene copolymer having
an ethylene content from about 0.1 to 7% by weight and
a propylene content from about 50 to 90% by weight and
a 1-butylene content from about 10 to 40% by weight, in each case based on the total weight of the polymer blend.

4. A multilayer polypropylene film as claimed in claim 1 wherein the HDPE has an MFI from about 0.2 to 50 g/10 min, a viscosity index from about 100 to 450 cm$^3$/g, a density of from 0.93 to 0.97 g/cm$^3$, a degree of crystallization from about 35 to 80% and a melting point from about 120° to 150° C.

5. A multilayer polypropylene film as claimed in claim 1, wherein the ratio between blend components A and B is in the range from about A:B=20:80 to A:B=80:20.

6. A multilayer polypropylene film as claimed in of claim 1, wherein the blend of components A and B has a melt flow index from about 1.5 to 12 g/10 min.

7. A multilayer polypropylene film as claimed in claim 1, wherein the ratio between components I and II is in the range from about I:II=90:10 to I:II=10:90.

8. A multilayer polypropylene film as claimed in claims 1, wherein the polypropylene or the polypropylene mixture of the base layer is selected from the group consisting of a propylene copolymer, a propylene terpolymer and mixtures thereof.

9. A multilayer polypropylene film as claimed in claim 1, wherein the film has a longitudinal shrinkage of greater than about 20% at 120° C., and a transverse shrinkage of greater than about 25% at 120° C.

10. A process for packaging an article comprising the steps of wrapping an article at least in part with the film of claim 1 followed by shrinking the film around the article.

11. A packaged article comprising the multilayer polypropylene film as claimed in claims 1 surrounding at least in part an article.

12. A multilayer polypropylene film of high shrinkage having at least one matte surface, comprising: at least one base layer which comprises a propylene polymer or a propylene polymer mixture; and at least one outer layer which comprises a mixture or a blend of two components I and II, wherein component I is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms, mixture or blends thereof and
a blend of two or more of said homopolymers, copolymers and terpolymers, mixed with one or more of said homopolymers, copolymers and terpolymers, and component II is selected from the group consisting of an HDPE and a blend of two components A and B, where blend component A essentially comprises an HDPE and blend component B is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene
a terpolymer of ethylene and propylene and another α-olefin having 5 to 10 carbon atoms and
mixtures or blends thereof, and the multilayer film has a longitudinal shrinkage of greater than about 20%, and a transverse shrinkage of greater than about 25%, both measured at 120° C., and wherein said multilayer film is made by a process comprising the steps of coextruding the melts corresponding to the individual layers of the film through a flat-film die, taking the coextruded film off over a take-off roll whose temperature is between about 20° and 100° C., biaxially stretching the film at a longitudinal stretching ratio ($S_l$) from about 4:1 to 9:1 and a transverse stretching ratio ($S_1$) from about 6:1 to 10:1, heat-setting the biaxially stretched film, and subsequently winding the film up.

13. A multilayer polypropylene film as claimed in claim 12, further comprising the step of corona-treating the film.

14. A multilayer polypropylene film as claimed in claim 12, wherein the longitudinal stretching of the film is carried out from about 80° to 120° C. and the transverse stretching is carried out from about 90° to 140° C.

15. A multilayer polypropylene film as claimed in claim 12, wherein the ratio ($S_t$: $S_l$) between the transverse stretching ratio $S_t$ and the longitudinal stretching ratio $S_l$ is less than about 2.

16. A multilayer polypropylene film as claimed in claim 12, wherein the film is stretched such that it has an approximately balanced orientation.

* * * * *

UNITED STATES PATENT AND TRADEMARK OFFICE
CERTIFICATE OF CORRECTION

PATENT NO.   : 5,494,717
DATED        : February 27, 1996
INVENTOR(S)  : Herbert PEIFFER et al.

It is certified that error appears in the above-indentified patent and that said Letters Patent is hereby corrected as shown below:

On the title page, item [*], "Feb. 6, 2013" should read --April 18, 2014--.

Signed and Sealed this

Seventeenth Day of September, 1996

Attest:

BRUCE LEHMAN

*Attesting Officer*                *Commissioner of Patents and Trademarks*